United States Patent Office 2,694,065
Patented Nov. 9, 1954

2,694,065
METHOD OF PREPARING SUBSTITUTED FORMYLTETRAHYDROPTERIDINES

Donna B. Cosulich, Plainfield, N. J., assignor to American Cyanamid Company, New York, N. Y., a corporation of Maine No Drawing. Application December 26, 1952, Serial No. 328,137

4 Claims. (Cl. 260—251.5)

This invention relates to a new method for the preparation of formyltetrahydropteridines. More particularly, it relates to a method for the preparation of 5-formyl-5,6,7,8-tetrahydropteroylamino acids.

Recent medical literature has shown that formyltetrahydropteroylamino acids, particularly formyltetrahydropteroylglutamic acid, have vitamin-like activity and stimulate the formation of red blood cells, and are thus useful in the treatment of certain types of anemias. It has also been shown that formyltetrahydropteroylglutamic acid competitively reverses the toxicity of aminopterin and thus may be used to combat the harmful effects sometimes produced when too much aminopterin is given in the treatment of leukemia. Aminopterin as a drug has a very narrow useful range, the therapeutic dose being quite close to the toxic dose. It is therefore highly desirable to have available a substance such as formyltetrahydropteroylglutamic acid which will effectively reverse the biological activity of aminopterin.

In the past several methods for the synthesis of 5-formyltetrahydropteroylamino acids have been described in the literature. In United States Patent 2,594,271 a method is described for the formylation of tetrahydropteroylamino acids by the use of an alkyl formimino ether. This process, while giving good results, usually requires an excess of formylating agent and this formylating agent is fairly expensive. Other methods have been described in which formic acid has been utilized as a formylating agent. While this latter method produces the desired compounds, an improvement in the yields and the intermediates used is desirable.

It has now been found that tetrahydropteroylamino acids can be formylated with a cheap and readily available intermediate. The process of the present invention uses as a formylating agent chloral (trichloroacetaldehyde) in formylating tetrahydropteroylamino acids. The process of the present invention may be illustrated by the following equation:

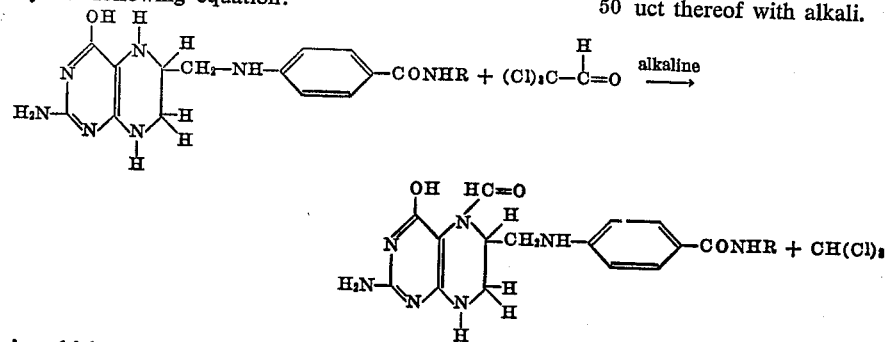

in which NHR is an amino acid, the NH being the amino radical of said amino acid.

The intermediates used in the process of the present invention, namely the tetrahydropteroylamino acids, are readily produced by the catalytic reduction of pteroylglutamic acid, pteroylaspartic acid, pteroylalanine, pteroylserine, and the like, with hydrogen and a catalyst such as platinum oxide. Other methods can be employed in preparing these intermediates such as the chemical reduction of pteroylglutamic acid by means of metals and an acid.

The process of the present invention is preferably carried out by dissolving or suspending the tetrahydropteroylamino acid in an inert organic solvent such as chloroform, carbon tetrachloride, ether, and the like. This intermediate in solution is then treated with chloral at temperatures ranging from about 15° C. to 100° C., preferably from 60° C. to 80° C for from one-half to twenty-four hours.

In the process of the present invention the predominant product initially obtained is a $N^{10}$-formyltetrahydropteroylamino acid. As shown in the equation above, chloroform is also produced as a by-product of this reaction. Under the conditions of the present reaction some $N^5$-formyltetrahydropteroylamino acid is also formed. However, in order to obtain substantially all of the compound as the 5-formyl derivative, it is necessary to treat the $N^{10}$-formyl reaction product with aqueous alkali in the absence of oxygen which causes the rearrangement of the $N^{10}$-formyl radical to the $N^5$-position. The product can be obtained in pure form by chromatographic adsorption on magnesium silicate followed by elution or by fractional recrystallization of one of its metallic salts.

The process of the present invention will now be illustrated in greater detail by means of the following example. All parts are by weight unless otherwise indicated.

Example

A solution of one part of pteroylglutamic acid in 30 parts by volume of glacial acetic acid and 30 parts by volume of dry ethylene glycol is reduced at about 20 pounds of hydrogen pressure over 0.1 part of platinum oxide catalyst. When the reduction is complete the catalyst is filtered off and the filtrate is poured into 600 parts by volume of ethyl acetate. The precipitated tetrahydropteroylglutamic acid is filtered, washed with ethyl acetate and dried under reduced pressure over concentrated sulfuric acid. A mixture of the tetrahydropteroylglutamic acid and 0.5 to 0.75 part of chloral in 80 parts by volume of chloroform is refluxed for 16 hours. The solid material, which is filtered off and dried to give 0.81 part, is treated with 800 parts by volume of 0.1 N sodium hydroxide from which air has been removed by boiling and cooling under nitrogen. This alkaline solution is heated under nitrogen at 90°–95° C. for one-half hour. This solution contains 5-formyl-5,6,7,8-tetrahydropteroylglutamic acid which shows the characteristic citrovorum factor activity by the assay of Leuconostoc citrovorum.

I claim:
1. A method of preparing formyltetrahydropteroylamino acids which comprises reacting a tetrahydropteroylamino acid with chloral in the presence of an inert organic solvent at a temperature within the range of 15° C. to 100° C. and subsequently reacting the product thereof with alkali.

2. A method which comprises the step of reacting tetrahydropteroylglutamic acid with chloral in an inert organic solvent at a temperature within the range of 15° to 100° C. and subsequently with alkali.

3. A method which comprises the steps of reacting tetrahydropteroylglutamic acid with chloral in an inert organic solvent at a temperature within the range of 15° C. to 100° C. and subsequently with alkali.

4. A method which comprises the steps of reacting tetrahydropteroylglutamic acid with chloral at a temperature within the range of 15° C. to 100° C. in the presence of an inert organic solvent for a period of from one-half to twenty-four hours and subsequently heating under alkaline conditions.

No references cited.